Figure 1:
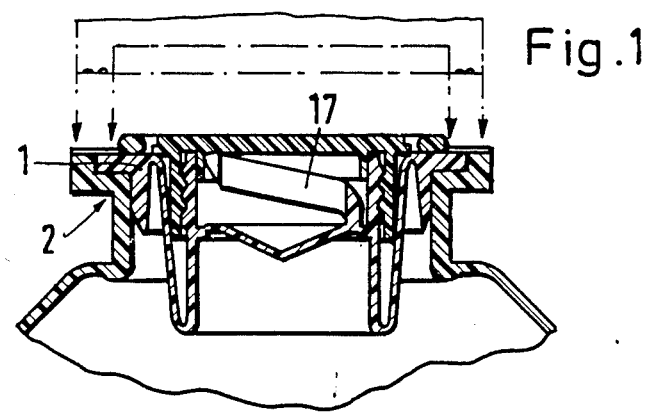

United States Patent [19]

Krautkrämer et al.

[11] Patent Number: 4,746,025
[45] Date of Patent: May 24, 1988

[54] PLASTIC CONTAINER CLOSURE AND METHOD OF MAKING IT

[75] Inventors: Günter J. Krautkrämer, Budenheim; Alexander Schmitz, Niedernhausen, both of Fed. Rep. of Germany

[73] Assignee: Jacob Berg GmbH & Co. KG, Budenheim, Fed. Rep. of Germany

[21] Appl. No.: 894,661

[22] Filed: Aug. 8, 1986

[30] Foreign Application Priority Data

Aug. 10, 1985 [DE] Fed. Rep. of Germany ....... 3528815

[51] Int. Cl.$^4$ .............................................. B65D 39/04
[52] U.S. Cl. ...................................... 215/232; 156/69; 156/73.1
[58] Field of Search .................. 215/232; 156/69, 73.1

[56] References Cited

U.S. PATENT DOCUMENTS

| | | | |
|---|---|---|---|
| 3,263,724 | 8/1966 | Mojonnier et al. | 150/0.5 |
| 3,402,873 | 9/1968 | Lauterbach | 156/69 X |
| 3,483,066 | 12/1969 | Harris et al. | 156/73.1 X |
| 3,561,668 | 2/1971 | Bergstrom | 215/232 X |
| 3,824,138 | 7/1974 | Karobath et al. | 156/69 |
| 4,411,720 | 10/1983 | Sager | 156/69 |

FOREIGN PATENT DOCUMENTS

| | | |
|---|---|---|
| 0079816 | 5/1983 | European Pat. Off. . |
| 1022155 | 6/1958 | Fed. Rep. of Germany . |
| 1536085 | 12/1969 | Fed. Rep. of Germany . |
| 7219898 | 5/1972 | Fed. Rep. of Germany . |
| 2088530 | 1/1972 | France . |
| 1469043 | 3/1977 | United Kingdom . |

Primary Examiner—Donald F. Norton
Attorney, Agent, or Firm—Howard M. Ellis; Michael L. Dunn

[57] ABSTRACT

A plastic closure for a plastic container and a method of making it. The closure is made of a plastic material of different hardness or melting temperature from the container and its sealing edge is fitted into the container neck. An edge surface of the sealing edge extends substantially immediately adjacent an edge surface of the neck and is welded to the neck by simultaneous heating of the adjacent edge surfaces.

14 Claims, 4 Drawing Sheets

PLASTIC CONTAINER CLOSURE AND METHOD OF MAKING IT

The invention relates to a plastic closure for a plastic container, with a neck provided on the container, the neck being made of a plastic material of a different hardness or melting temperature from the closure and having a sealing edge of the closure inserted in it.

Closures of this type are known and are generally inserted with a more or less inaccurate fit in generally cylindrical, nozzle shaped necks of plastic containers. The closures are known chiefly in plastic containers for motor oil and also containers for other liquids such as food and drinks (cooking oil, vinegar and wine) or liquid chemical products.

Since the dimensional stability of the necks of plastic canisters is not very good and fluctuations and irregularities in the shape of the necks may also arise in the production process, the only way in which a plastic closure can be fixed in such a neck so that it is impervious to liquid is by having a comparatively expensive construction. A sealing edge, provided externally with a row of parallel lamellar blades in a ring shape, usually projects deep into the neck of the container. One or more of the blades come into contact with the inner wall of the neck, more or less at random, and thus provide a seal. A web or cam, again in a ring shape, is also frequently provided on the sealing edge below the blades, designed to engage in the container below the neck and thus anchor the closure in the container.

The closures are frequently provided with a bellows-like corrugation which adjoins the sealing edge, with its other end extending into a pouring aperture. Provided that the closure material is sufficiently deformable the pouring aperture, which is smaller in diameter than the sealing edge, can be pressed into the neck of the container by deforming the corrugation, so that the pouring aperture does not project above the top edge of the neck. A tear off ring at the top end of the pouring aperture enables the aperture to be pulled out of the neck when required.

Some of the above mentioned closures have considerable disadvantages. For example the closure, which is made of a more or less resilient plastic material, can be levered out of the container with a tool such as a screwdriver, by inserting the tool between the neck of the container and the sealing edge. Since there are usually no traces left of the removal of the closure and it can be reinserted in the neck of the container, such closures lend themselves to improper exchange or removal of the contents.

Furthermore the tightness of the closure can only be guaranteed if the neck is made with comparatively high precision, and for this reason particularly simple processes may not be used. Another disadvantage is that a relatively large amount of material is used for the sealing edge, which projects a long way into the container, and for the lamellar blades and the fastening web or cams. In addition the moulding of the sealing edge and adjacent sealing and fastening elements involve a relatively high outlay on apparatus, representing a considerable cost factor.

The problem on which the invention is based is accordingly to provide a plastic closure for plastic containers which can be manufactured with only a small outlay on apparatus, which allows for the neck to the produced simply, which requires less material, which can be fixed securely onto the neck and which cannot be removed from the container without damaging either the closure or the container.

The problem is solved in that an edge surface of the sealing edge extends substantially immediately adjacent an edge surface of the neck, and that the sealing edge is welded to the neck by simultaneous heating of the adjacent edge surfaces.

The said edge surfaces preferably lie adjacent one another in one plane prior to welding, so that they can easily be treated simultaneously by one welding tool with a flat welding surface.

However, the surfaces may be at substantially any angle to one another, provided that they can be heated simultaneously by one suitably shaped welding tool, with the two different liquid plastic materials flowing into one another. This flowing process may sometimes be facilitated by providing a gap of suitable width between the two parts to be welded. By "simultaneous melting" we mean that the two plastic materials to be welded together, would, if possible, each reach their appropriate melting temperature simultaneoulsy, so that they can flow into one another instantly the moment they are fluidified. For this purpose it may be necessary to start heating the higher melting plastic somewhat earlier than the lower melting one, or else to start the heating process simultaneously but to supply more heat to the higher melting plastic than to the lower melting one.

The first mentioned possibility can easily be obtained by arranging the two edge surfaces parallel with one another but somewhat offset rather than in an common plane, so that the edge surface of the higher melting plastic projects somewhat from that of the lower melting one and comes into contact with the flat welding surface of the tool somewhat earlier.

The process will be described in detail later.

The welding of the closure to the neck of the container is advantageous from several points of view. The dimensional stability of the neck and also of the sealing edge of the closure is relatively unimportant provided that the parts to be welded are close enough together, an arrangement which cannot automatically be obtained with conventional mass production means. The relatively large outlay on moulding the sealing edge with the attached lamellar blades and fastening elements is avoided. In addition the weld is absolutely liquidtight and the closure cannot be removed from the container without obvious damage.

A manufacturing method which is inexpensive and economical in material is particularly advantageous, in that such closures are a mass produced article which is sold in very large quantities and fitted on the appropriate containers. The invention therefore provides for the neck of the container and the sealing edge of the closure to be substantially cylindrical, a feature which also makes them easier to manufacture and handle.

In a plastic closure according to the invention the sealing edge has projecting a closure flange and lies on the edge of the neck. This ensures that when the closure has been inserted in the neck aperture it is substantially fixed in position, so that the parts thus correctly positioned can be welded without further adjustment of the closure.

In a closure according to the invention it is particularly advantageous for the neck edge to be in the form of a flange with an upright web at the edge, the height of the web corresponds to the thickness of the closure flange and its internal dimensions being smaller than the external dimensions of the flange. In the case of a cylindrical closure this means that the annular flange at the sealing edge of the closure lies on the flange-like edge of the neck, with the closure flange also being encircled by and fitting the web at the edge of the flange. At the same time the web is of a height such that its top edge ends level with the top edge of the flange, so that its surface facing away from the container is immediately adjacent and in the same plane as the surface of the closure flange facing away from the container.

This construction of the closure and neck edge gives particularly simple and safe access to appropriate welding means.

In respect of the method of making a plastic closure for a container made of a plastic of different hardness or melting temperature from the closure, with a neck which is provided on the container and has a sealing edge of the closure inserted in it, the problem on which the invention is based is solved by simultaneously heating at least part of the adjacent edge surface of the sealing edge and edge surface of the neck to a temperature slightly above the melting temperature of the respective plastic material involved.

The simultaneous heating of the two plastic materials of differnet hardness and/or melting temperature causes them to fluidify, flow into one another and thus form a firm, tight seam. Methods of welding plastic parts together by heating both parts simultaneously are indeed known, but these are only concerned with welding plastic material of substantially the same hardness and melting temperature. Methods are also known of bonding plastics with different melting temperatures, by fluidifying the lower melting one and thus sticking it to the higher melting one which remains solid. However, an adhesive bond of this type is not very strong and may become detached simply by pulling out a tear off ring in the embodiment described above.

The method of the invention further provides for the adjacent edge surfaces of the sealing edge and neck to be heated simultaneously to a temperature slighly above the melting temperature of the respective plastics, over their whole length at both sides of the dividing line.

In this way a complete seal and fastening of the closure to the container is obtained on one short welding operation.

In respect of the apparatus for carrying out said method the problem on which the invention is based is solved when a sealing element at least has sealing surfaces which extend parallel with and can be brought into contact with the edge surfaces of the sealing edge and neck which have to be welded.

When the edge surfaces of the sealing edge and neck come into contact with the sealing element they are heated until they become fluid, flow into one another and thus form the seam. Since the surface of the welding element touches both edge surfaces simultaneously one can assume that the lower melting plastic will start flowing first but will lose contact with the hot sealing surface so long as the element is suported by the edge surface of the still solid higher melting plastic part. This prevents overheating and decomposition of the lower melting plastic. As soon as the higher melting material becomes fluid, the two plastics flow into one another and form a seam.

Depending on the nature, flow properties and density of the plastics to be bonded, the gap between the parts to be joined, which runs along the dividing line prior to welding, may be of various widths, depths and/or inclinations to give optimum mixing of the fluid components.

With a view to making the seam as clean and even as possible the invention provides for the use of an anvil as an abutment for the welding element which is pressed onto the edge surfaces. The possibility and method of mounting the anvil will depend, however, on the shape of the closure and neck and the position of the seam.

For the embodiment of the welded plastic closure in which the neck has a flange with a web at the edge and the sealing edge has a closure flange or extension of the same height as the web, it is adviseable and advantageous for the welding element to be in the form of a hollow cylinder and the anvil in the form of a divided ring.

The internal diameter of the hollow cylinder is smaller than the external diameter of the annular extension and the external diameter of the cylinder is larger than the internal diameter of the circular web. This ensures that the welding surface of the tool will always engage the adjacent edge surfaces of the extension and web at both sides of the dividing line or gap and will form a complete circular seam.

It is further desirable for the internal diameter of the hollow cylinder to be larger than that of the extension and for the external diameter of the cylinder to be smaller than that of the web. This measure ensures that small edge portions of the plastic materials to be welded are left inside and/or outside the cylinder, so that the liquid plastic cannot flow away laterally.

Another feature of the invention is that the welding element can be heated by a coil at its outer periphery.

Supplying the heat from the outside produces a temperature gradient on the surface of the welding element in a radial direction. In this way, for example, the web at the edge of the neck, which is further outwards and higher melting, receives more heat than the lower melting attachment in the inner part of the welding surface; this has the advantageous result of faster fluidification and mixing of the two plastics, so that the whole welding operation is accelerated. A corresponding heating coil could of course be provided inside the cylinder or inside a differently shaped welding element, should the higher melting plastic be nearer that area.

In a specially preferred embodiment of the invention the welding element is a sonotrode (an ultrasonic head).

Ultrasonic welding is already known per se.

An ultrasonic head (a sonotrode) transmits ultrasonic oscillations to the object to be heated or welded. If the ultrasonic waves are strong enough, so much energy is absorbed in the transition regions in the plastic and converted to heat energy, by inelastic processes and friction, that the plastic begins to melt. Ultrasonic waves have the advantage that they can be radiated with a certain directivity, so that one can quite diliberately heat inner regions of the plastic to be welded. Thus heating is not merely superficial but also takes in deeper regions; this also helps to accelerate the welding process and also gives a deeper, better seam.

The heat supply is interrupted very quickly when the plastic loses contact with the sonotrode due to its fluidification; the heat supplied to the plastic is thus, so to speak, automatically controlled by fluidification. The additional impression of a temperature gradient, as described above, may also be advantageous.

Figure 2A:
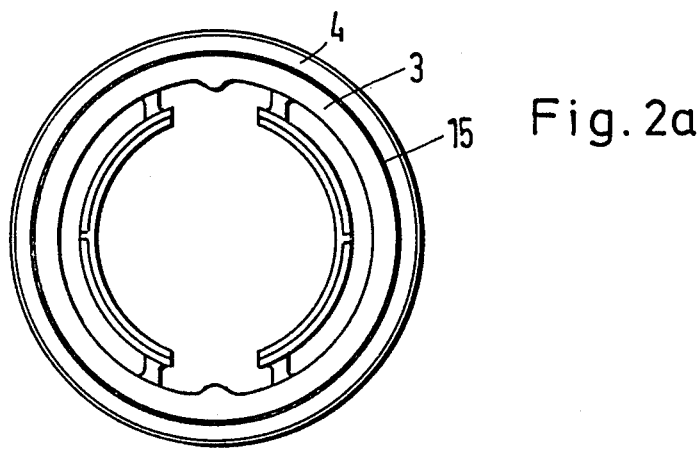
Figure 2B:
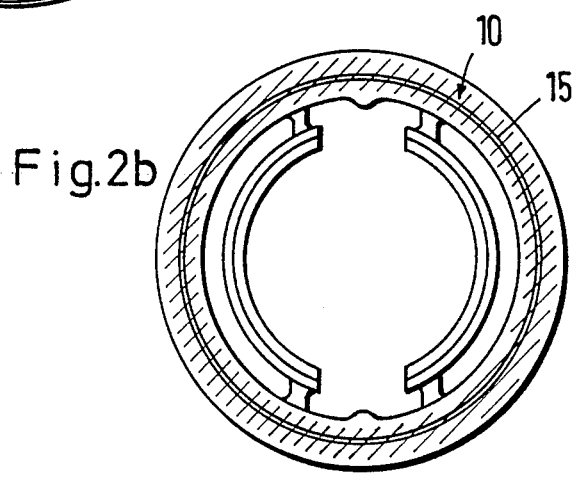
Figure 3A:
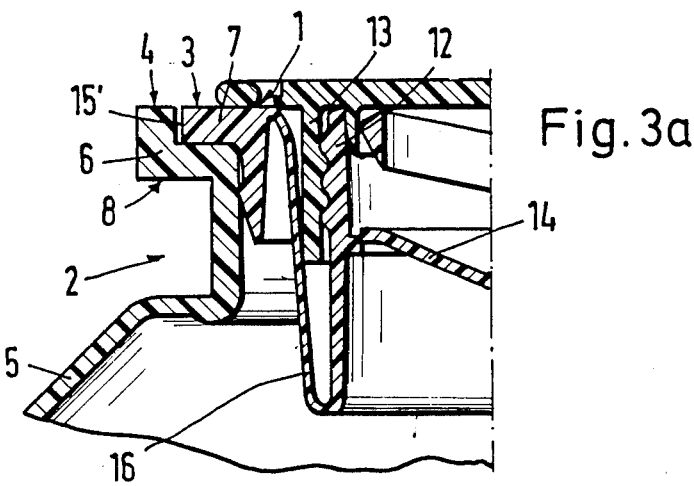

Other advantages, features and applications of the invention will emerge from the following description of preferred embodiments and the drawings to which it refers. In the drawings:

FIG. 1 is a section showing a preferred embodiment of a plastic closure inserted in the neck of a container FIG. 2a is a view of FIG. 1 from above prior to welding FIG. 2b is a view of FIG. 1 from above after welding FIG. 3a shows a fragment of FIG. 1

Figure 3B:
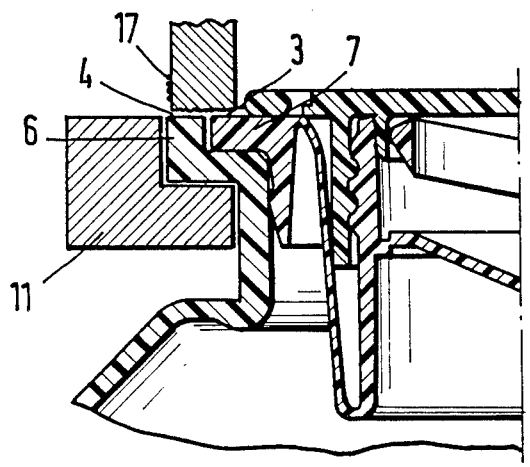
Figure 3C:
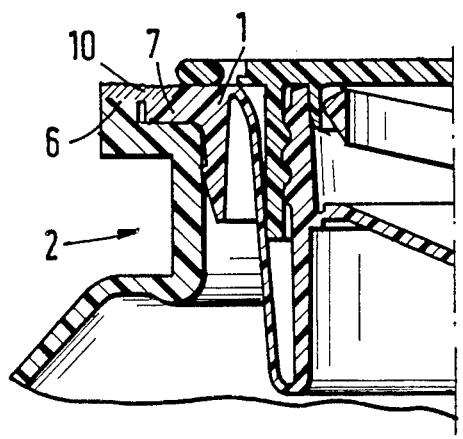
Figure 4A:
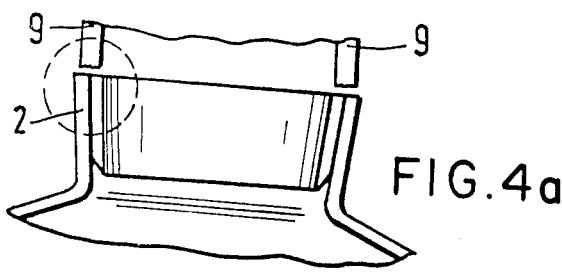
Figure 4B:
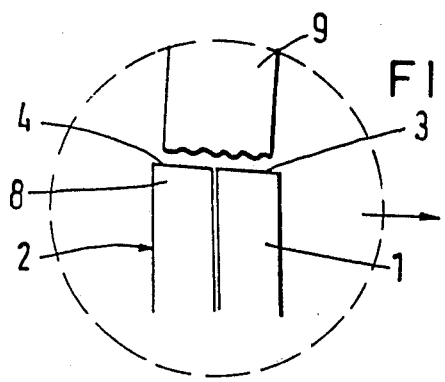
Figure 4C:
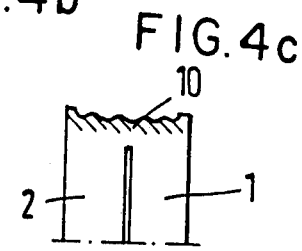
Figure 5A:
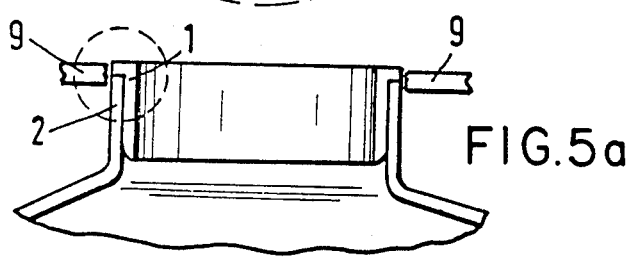
Figure 5B:
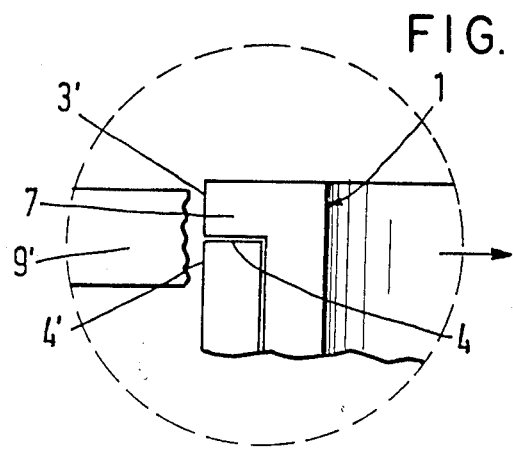
Figure 5C:
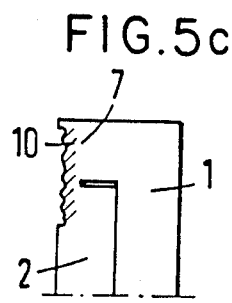
Figure 6:
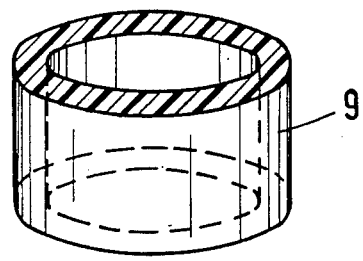
Figure 6:
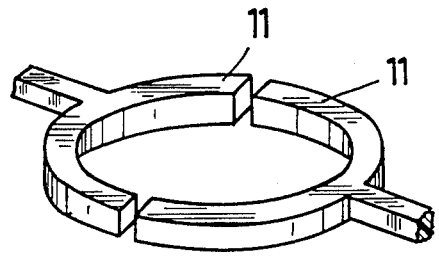

FIGS. 3b and c show the same fragment as FIG. 3a, respectively shortly before and after welding FIG. 4a shows a further embodiment, the only part of the enclosure illustrated being the sealing edge FIGS. 4b and c correspond to FIGS. 3b and 3c but in the FIG. 4a embodiment FIGS. 5a to c show a further embodiment similar to FIGS. 4a to c and FIG. 6 shows the preferred embodiment of a welding means Referring to FIG. 1 and FIGS. 3a to c, these show a preferred embodiment of a plastic closure for plastic containers in cross-section.

The top of the neck 2 of the container 5 has a flange-like edge 8 with a web 6; the height of the web is just equal to the thickness (or height) of the extension 7 of the sealing edge 1, so that the edge surface 3 of the extension 7 (closure flange) and the edge surface 4 of the web lie immediately adjacent one another in a common plane. The sealing edge 1 is adjoined by a bellows like corrugation 16 which enables the closure to be pushed in. The other end of the corrugation 16 extends into a pour out spout 12 provided with screw thread, onto which the threaded closure 13 is screwed. The pouring aperture is also secured by a sealing membrane 14. FIG. 1 also shows a tear off ring 17, with the aid of which the pour out spout 12, which is joined to the sealing edge 1 by the corrugation 16, can be pulled out of the neck 2.

Between the extension 7 and the web 6 at the edge there is a narrow dividing cap 15', shown as a dividing line 15 in FIG. 2a. The width of the gap is adjusted to suit the liquid plastic material; the gap 15' in the section shown in FIG. 3a could also be inclined. Thus the extension 7 and web 6 need not necessarily have rectangular corners.

In addition to the closure the welding element 9 and the anvil 11 which acts as an abutment are shown in cross-section in FIG. 3b. In this embodiment the welding element 9 is in the form of a hollow cylinder, of a diameter and wall thickness such that the welding surface covers the edge surfaces 3 and 4 on both sides of the gap 15' round the whole periphery of the closure, to a great extent but not completely.

The heating coil 17 to generate a temperature gradient radially of the welding element 9 is also shown in cross-section.

FIG. 3 shows the closure immediately before the welding operation. When the sonotrode 9 is lowered onto the edge surfaces 3 and 4, the extension 7 of the sealing edge 1—which is here assumed to have a lower melting point—begins to melt down; contact with the sonotrode 9 become worse in the process and further heating of the liquid is avoided. But at the same time contact is maintained between the sonotrode 9 and the web 6 at the edge, so that the web is heated to its melting temperature and finally mixes in the liquid state with the liquid plastic material of the extension 7.

The resultant seam 10 can be seen from FIG. 3c. In this state the sealing edge 1 is joined to the neck 2 of the container 3 by the web 6 in an absolutely liquid tight and secure manner. The strength of the seam 10 is the same as that of the actual closure or container material.

In this embodiment production of the sealing edge 1 and thus of the whole closure requires less material than known closures with lamellar sealing blades and fastening elements.

FIG. 4a shows a further embodiment of a container neck and the associated closure in cross-section. The only part of the closure which is visible is the sealing edge 1. In this embodiment the neck 2 of the container 5 follows a conical path, as does the sealing edge 1 of the closure. This embodiment is particularly simple to produce and economical in material. The conical shape of the neck 2 gives the sealing edge 1 an adequately secure seat. Any overlapping material in the region of the edge surfaces can be melted away by the welding element 9. FIGS. 4b and 4c show the closure immediately before and after welding, similarly to FIGS. 3b and 3c. In this case the gap 15' is not perpendicular to the welding plane but at a slight inclination to it.

FIG. 5a is a cross-section through a further embodiment similar to FIG. 4a, where the neck 2 again has a very simple shape. Here the sealing edge 1 has an extension 7 lying on the edge 8 of the neck 2, so that the lateral edge surfaces 3' and 4' of the extension 7 and neck 2 form the adjacent sealing surfaces. The welding element 9' accordingly moves in from the side. In this case, however, welding in a single step is hardly possible, since a plurality of welding elements 9', which in this embodiment are arcuate in plan, can virtually not be moved in concentrically. To obtain a continuous peripheral seam welding elements 9' which are arcuate in plan and arranged opposite one another e.g. in a cross or star shape can be applied two or more times.

FIGS. 5b and 5c show the seam shortly before and after welding. FIG. 2 is a plan view of the seam in the embodiment shown in FIGS. 1 and 3a to c. The seam 10 cn be seen to have a certain pattern on it; this comes from pressure from the sonotrode welding surface, which generally has a certain pattern or roughening to improve heat generation. However, the process can also be carried out with a completely smooth welding surface, particularly if the welding element is a conventionally heated one instead of a sonotrode.

We claim:

1. A container closure, which comprises a plastic container neck defining a container opening, and a plastic neck insert with a central opening, said container neck and neck insert having exterior sealing edges, the plastics of said neck and neck insert having different melting temperatures, said neck insert being positioned inside the opening of said container neck so their respective sealing edges are aligned in a common exterior plane substantially immediately adjacent to one another, said container neck and neck insert being welded together by simultaneously melting said aligned, adjacent sealing edges.

2. The container closure of claim 1, characterised in that the neck of the container and the sealing edges of the container neck and neck insert are substantially cylindrical.

3. The container closure of claim 1, characterized in that the edge of the neck insert includes a flange and the edge of the container neck includes a flange with an upright web at the edge, the thickness of the flange of said neck insert and the height of said upright web of the container neck being substantially equal so their sealing edges lie adjacent to one another in a common plane.

4. A method of making the container closure of claim 1, characterized in that at least part of the adjacent exterior sealing edges of the container neck and neck insert are simultaneously heated to a temperature slightly above the melting temperature of each of the respective plastic materials.

5. The method of claim 4 including the step of welding said container neck and neck insert along the entire length of said aligned sealing edges by heating to a temperature above the melting temperature of each of the plastic materials.

6. The method of claim 5 wherein the sealing edges of the container neck and neck insert are simultaneously heated by ultrasonic welding means.

7. The method of claim 4 wherein the sealing edges of the container neck and neck insert are simultaneously heated by ultrasonic welding means.

8. The container closure of claim 1 in combination with container cover means.

9. A container closure, which comprises a plastic container neck defining a central opening, and a plastic neck insert with a central opening, said container neck and neck insert having exterior sealing edges, the plastics of said neck and neck insert having different hardnesses, said neck insert being positioned inside the opening of said container neck so their respective sealing edges are aligned in a common exterior plane substantially immediately adjacent to one another, said container neck and neck insert being welded together by simultaneous melting said aligned, adjacent sealing edges.

10. The container closure of claim 9 in combination with container cover means.

11. A method of making a container closure, which comprises the steps of providing a plastic container comprising a container neck which defines a container opening; providing a plastic neck insert with a central opening, said container neck and neck insert having exterior sealing edges, the plastics of said container neck and neck insert having different melting temperatures; positioning said neck insert in said container opening; aligning the sealing edges of said container neck and neck insert in a common exterior plane substantially immediately adjacent to one another, and welding said container neck and neck insert by simultaneously melting at least part of said aligned, adjacent sealing edges.

12. The method of claim 11 including the step of welding said container neck and neck insert along the entire length of said aligned sealing edges by heating to a temperature above the melting temperature of each of the plastic materials.

13. The method of claim 12 wherein the sealing edges of the container neck and neck insert are simultaneously heated by ultrasonic welding means.

14. The method of claim 11 wherein the sealing edges of the container neck and neck insert are simultaneously heated by ultrasonic welding means.

* * * * *